(12) United States Patent
Kim et al.

(10) Patent No.: US 10,264,176 B2
(45) Date of Patent: Apr. 16, 2019

(54) GAZE TRACKING DEVICE AND METHOD AND RECORDING MEDIUM FOR PERFORMING THE SAME

(71) Applicant: FOUNDATION OF SOONGSIL UNIVERSITY-INDUSTRY COOPERATION, Seoul (KR)

(72) Inventors: Gyeyoung Kim, Anyang-si (KR); Heesub Lee, Gwacheon-si (KR); Gyungju Lee, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 111 days.

(21) Appl. No.: 15/320,720

(22) PCT Filed: Jul. 1, 2014

(86) PCT No.: PCT/KR2014/005868
§ 371 (c)(1),
(2) Date: Dec. 20, 2016

(87) PCT Pub. No.: WO2016/002986
PCT Pub. Date: Jan. 7, 2016

(65) Prior Publication Data
US 2017/0134643 A1    May 11, 2017

(30) Foreign Application Priority Data
Jun. 30, 2014    (KR) .................. 10-2014-0081280

(51) Int. Cl.
*H04N 7/00*    (2011.01)
*H04N 5/232*    (2006.01)
(Continued)

(52) U.S. Cl.
CPC ....... *H04N 5/23219* (2013.01); *G06K 9/0061* (2013.01); *G06K 9/00255* (2013.01);
(Continued)

(58) Field of Classification Search
CPC ........... H04N 5/23219; H04N 5/23212; H04N 5/23238; H04N 5/23245; G06T 7/13;
(Continued)

(56) References Cited

U.S. PATENT DOCUMENTS 6,734,911 B1 *    5/2004    Lyons .................... G01S 3/781
                                                        348/169
2016/0210503 A1 *    7/2016    Yin ........................ G06F 3/00

FOREIGN PATENT DOCUMENTS

KR    10-2002-0028406 A    4/2002
KR    10-2012-0008827 A    2/2012
KR    10-2012-0057033 A    6/2012

OTHER PUBLICATIONS

Kang Ryoung Park "Gaze Detection System by Wide and Narrow View Camera", The Journal of Korean Institute of Communications and Information Sciences, vol. 28, No. 12C, pp. 1239-1249, Dec. 2003.
(Continued)

*Primary Examiner* — Jared Walker
(74) *Attorney, Agent, or Firm* — Novick, Kim & Lee, PLLC; Sang Ho Lee

(57) ABSTRACT

A gaze tracking device and method, and a recording medium for performing the same are disclosed. The gaze tracking device, which is a device for tracking the gaze of a person present in an area in which the gaze tracking device is located, sets a photographing unit of the gaze tracking device to a wide-angle mode, photographs an area within a wide-angle view of the photographing unit, detects the person from a photographed image, and converts the wide-
(Continued)

angle mode of the photographing unit into a narrow-angle mode so as to track the gaze of the person when the person is detected from the photographed image, wherein when tracking the gaze of the person by converting the wide-angle mode of the photographing unit into the narrow-angle mode, if the person is out of the shooting range of the narrow-angle mode while tracking the gaze of the person in the narrow-angle mode of the photographing unit, the photographing unit is converted from the narrow-angle mode into the wide-angle mode so as to track the gaze of the person by re-searching for the person.

12 Claims, 14 Drawing Sheets

(51) Int. Cl.
G06T 7/246 (2017.01)
G06T 7/13 (2017.01)
G06K 9/00 (2006.01)
(52) U.S. Cl.
CPC ..... *G06K 9/00281* (2013.01); *G06K 9/00604* (2013.01); *G06T 7/13* (2017.01); *G06T 7/246* (2017.01); *H04N 5/23212* (2013.01); *H04N 5/23238* (2013.01); *H04N 5/23245* (2013.01); *H04N 5/23296* (2013.01); *G06T 2207/10148* (2013.01); *G06T 2207/30201* (2013.01)
(58) Field of Classification Search
CPC ........... G06T 7/246; G06T 2207/30201; G06T 2207/10148; G06K 9/0061; G06K 9/00281; G06K 9/00604; G06K 9/00255
USPC ........................................................ 348/36
See application file for complete search history.

(56) References Cited

OTHER PUBLICATIONS

Jeongwan Bae "Face Detecting and Tracking using Active Appearance Models and Camshift with a Pan-Tilt-Zoom-Camera" 32nd Fall Conference Papers, Yonsei University, vol. 32, No. 2, pp. 931-933.

H.R. Chennamma, "A Survey on Eye-Gaze Tracking Techiniques" Indian Journal of Computer Science and Engineering (IJCSE), vol. 4, No. 5, Oct. 2013.

Yun Hwan Kim "Technology for Tracking Device of Electrical and Electronic Moving Object", KIPA, Oct. 12, 2011.

* cited by examiner

GAZE TRACKING DEVICE AND METHOD AND RECORDING MEDIUM FOR PERFORMING THE SAME

TECHNICAL FIELD

The present invention relates to a gaze tracking device and method and a recording medium for performing the same, and more particularly, to a gaze tracking device and method which tracks the gaze of a person located within a predetermined range, and a recording medium for performing the same.

BACKGROUND ART

Generally, a gaze tracking technology is a technology for detecting the movement of pupils, tracking the position of a gaze, detecting the movement of the pupils through an analysis of an image taken by a camera in real time, and tracking the gaze of a person by calculating the direction of the gaze based on fixed position reflected on the cornea.

Accordingly, in the related art, the gaze of a person located within a photographing range of a camera was tracked. However, in the case that a person deviates from the photographing range of the camera while the camera tracks the gaze in the event that a single camera is being used, a corresponding operation is generally stopped, and when an operation of tracking the gaze is performed using a plurality of cameras, the gaze of the person is tracked by detecting the person by the camera which does not detect the gaze of the person, again.

However, since such a gaze tracking technology should perform an operation of performing a calibration, the process of gaze tracking becomes complicated, and since a plurality of cameras are used, there is also a disadvantage that the cost of the product per unit would increase.

DISCLOSURE

Technical Problem

The present invention is directed to providing a gaze tracking device which may continuously track the gaze of a person through a switch between a wide-angle mode of a camera and a narrow-angle mode thereof even when the person deviates from a photographing range of the camera while the gaze of the person is tracked using a single camera.

Also, the present invention is directed to providing a gaze tracking method which tracks the gaze of a person by primarily detecting the center of each of pupil from a photographed image and secondarily, detecting the center of each of the pupils based on the primarily detected centers of the pupils to solve the problem that the pupils are erroneously detected due to extraneous noise such as a light which can be reflected on glasses or pupils.

Technical Solution

One aspect of the present invention provides a gaze tracking device which tracks a gaze of a person using a plurality of switchable photographing modes, including a camera part set into a wide-angle mode to photograph an image around the camera part 100 within a wide-angle visual field; and a control part configured to detect a face area of a person when the person is detected from an image photographed in the wide-angle mode of the camera part, to switch the wide-angle mode of the camera part into a narrow-angle mode and to track a gaze of the person, to switch the camera part into the wide-angle mode when the person deviates from a narrow-angle visual field of the narrow-angle mode while the gaze of the person is tracked, and to control the camera part to be moved in a direction in which the person deviates while being switched into the wide-angle mode and to search again for the person.

The control part may include a face area detecting part configured to detect the face area of the person; a mode switching part configured to switch the wide-angle mode of the camera part into the narrow-angle mode to photograph an enlarged image of the face area; a camera movement control part configured to control the camera part to be moved while being switched into the wide-angle mode in the direction in which the person deviates and thus to search again for the person; an eye area detection part configured to detect an eye area from the enlarged and photographed image of the face area; and a pupil detecting part configured to detect a pupil of an eye from the eye area and to control the camera part to track the detected pupil.

Also, the face area detecting part may detect the face area using a feature which can distinguish between the face area and an area which is not the face area in the photographed image, and the eye area detection part may detect the eye area using a feature which can distinguish between the eye area and an area which is not the eye area.

The pupil detecting part may calculate a primary pupil center from the detected eye area, may detect a secondary pupil center of the pupil using circle and edge information based on the calculated primary pupil center and may track the secondary pupil center.

The primary pupil center may be calculated by applying a variance projection function (VPF) to the detected eye area, an edge point of the eye area may be detected based on the primary pupil center, an effective point of the detected edge points may be calculated, a perpendicular bisector between the calculated effective points may be accumulated, a crossing point of the accumulated perpendicular bisectors may be detected as the secondary pupil center of the pupil and the secondary pupil center may be tracked.

Another aspect of the present invention provides a gaze tracking method including photographing an image around the camera part 100 within a wide-angle visual field using a camera part set into a wide-angle mode; detecting a person from the photographed image; detecting a face area of the person when the person is detected from the photographed image; switching the wide-angle mode of the camera part into a narrow-angle mode to track a gaze from the face area; and switching the camera part into the wide-angle mode to search again for the person when the person deviates from a narrow-angle visual field of the narrow-angle mode while the gaze of the person is tracked in the switched narrow-angle mode, moving the camera part in a direction in which the person deviates and searching again for the person in the wide-angle mode.

The detecting of the person from the photographed image may detect the face area of the person when the person is detected from the photographed image, may control the camera part according to a predetermined photographing pattern when the person is not detected from the photographed image and may track the person.

The switching of the wide-angle mode of the camera part into the narrow-angle mode to track the gaze from the face area of the person may enlarge and photograph the detected face area by switching from the wide-angle mode in which a focal distance of a lens of the camera part is a predetermined reference value or less to the narrow-angle mode in which the focal distance of the lens of the camera part is the predetermined reference value or more.

The obtaining of the enlarged image of the detected face area may adjust the focal distance of the lens of the camera part in the narrow-angle mode to enlarge and photograph the detected face area by a size of the photographed image around the camera part 100 within the wide-angle visual field.

Advantageous Effects

According to one aspect of the present invention, it is possible to track the gaze of the person within a photographing range through the switch between the wide-angle mode of the single camera and the narrow-angle mode thereof and also to track the gaze of the person by searching again for the person through the switch between the wide-angle mode of the camera and the narrow-angle mode thereof even when the person deviates from the photographing range of the camera.

Also, since the gaze of the person is tracked by calculating the primary pupil center and detecting the secondary pupil center based on the calculated primary pupil center, it is possible to solve the problem that the pupils are erroneously detected due to the noise such as a light which is reflected on glasses or the pupils of the eyes.

MODES OF THE INVENTION

Figure 1:
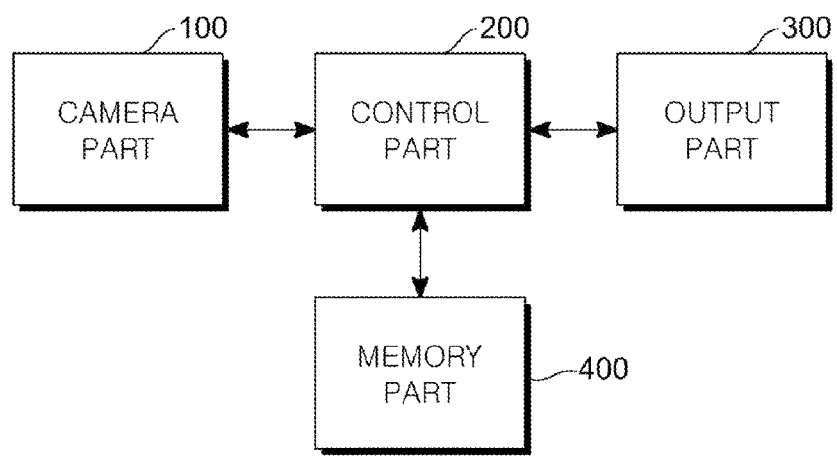
FIG. 1 is a control block diagram of a gaze tracking device according to one embodiment of the present invention.

Detailed references are made to particular embodiments with reference to the accompanying drawings so that those skilled in the art can easily practice the particular embodiments. It is to be understood that a variety of embodiments of the present disclosure are different but are not necessarily mutually exclusive. For example, particular features, structure and characteristics set forth herein may be implemented by different embodiments in connection with an embodiment disclosed herein, without departing from the spirit and scope of the disclosure. In addition, it is to be understood that positions and arrangements of individual elements of the embodiment disclosed herein may be changed without departing from the spirit and scope of the disclosure. Accordingly, embodiments described in the specification and elements shown in the drawings are illustrative only and do not cover all of the technical ideas of the present disclosure. It should be, therefore, understood that the scope of the disclosure is defined by only the claims and their equivalents, if stated appropriately. Throughout the drawings, the same or similar elements are denoted by the same reference numerals.

Hereinafter, exemplary embodiments of the present invention will be described in detail with reference to the drawings.

FIG. 1 is a control block diagram of a gaze tracking device according to one embodiment of the present invention.

A gaze tracking device 1 may include a camera part 100, a control part 200, an output part 300, and a memory part 400. FIG. 1 illustrates the gaze tracking device 1 including various elements. However, all of the illustrated elements are not essential elements. The gaze tracking device 1 may be realized by more elements than the illustrated elements or may be realized by fewer elements than the illustrated elements. Hereinafter, the above-described elements will be described in detail.

The camera part 100 may include a camera which photographs a peripheral background region or a person. The camera part 100 is configured with a single camera. The single camera may perform up and down and left and right movements and an expansion/contraction operation of an image using a zoom function.

Also, the camera part 100 may capture an image while being set in a wide-angle mode and a narrow-angle mode by the control part 200.

Here, the wide-angle mode is a mode in which a focal distance of a lens of the camera part 100 is set to be the same as or less than a predetermined reference value and a relatively wide-angle visual field is captured. The narrow-angle mode is a mode in which the focal distance of the lens of the camera part 100 is set to be the same as or more than the predetermined reference value and a relatively narrow-angle visual field is captured. For example, in the wide-angle mode, the focal distance may be set to 50 mm or less and the camera part 100 may photograph the wide-angle visual field while being moved up and down and left and right. In the narrow-angle mode, the focal distance may be set to 50 mm or more and a certain area may be enlarged and photographed. In general, the focal distance in the wide-angle mode may be set to 24 to 50 mm, and the focal distance in the narrow-angle mode may be set to 80 to 120 mm. Of course, the focal distances may be changed by a setting operation.

According to one embodiment of the present invention, in the wide-angle mode, an image around the camera part 100 in the wide-angle visual field is photographed, and a person may be detected from the photographed image around the camera part 100, and a face area of the detected person may be detected. Also, in the narrow-angle mode, when the face area is detected, the detected face area may be enlarged by adjusting the focal distance and then may be photographed.

The control part 200 may control the camera part 100 to track a gaze of the person.

Also, the control part 200 may track the gaze of the person by controlling a plurality of photographing modes of the camera part 100. The control part 200 may control the camera part 100 to be set into one of the wide-angle mode and the narrow-angle mode, and to track the gaze of the person.

The control part 200 may control the camera part 100 to be set in the wide-angle mode, and thus to capture the image around the camera part 100 in the wide-angle visual field. The control part 200 may detect a person from a photographed image of an area in the wide-angle visual field. When the person is detected from the photographed image around the camera part 100 within the wide-angle visual field, a face area of the detected person may be detected, and when the person is not detected from the photographed image, the camera part 100 may be controlled to be moved along a predetermined photographing pattern and thus the person may be detected.

Also, the control part 200 may control the camera part 100 to photograph an enlarged image with respect to the detected face area to solve a problem that detection accuracy is lowered due to a small size of an object to be detected. To photograph the enlarged image with respect to the detected face area, the control part 200 may control the wide-angle mode of the camera part 100 to be switched into the narrow-angle mode.

At this point, the control part 200 may adjust the focal distance of the lens of the camera part 100 according to a size ratio of the face area with respect to an entire image before the expansion by switching the photographing mode of the camera part 100 into the narrow-angle mode and thus may photograph the enlarged image with respect to the face area.

Also, the control part 200 may detect an eye area from the enlarged image of the face area, may detect pupils of eyes from the detected eye area, and may track the gaze of the person by tracking movement of the center of the detected pupil.

Also, the control part 200 may switch the photographing mode of the camera part 100 from the narrow-angle mode to the wide-angle mode when the person deviates from a range of the image photographed in the narrow-angle mode while tracking the gaze of the person from the image photographed in the narrow-angle mode and may search again for the person.

At this point, when the person deviates from the range of the image photographed in the narrow-angle mode, the control part 200 may switch the camera part 100 into the wide-angle mode, may detect again the face area of the person when the person is detected in the wide-angle visual field and may perform again a gaze tracking process. And when the person is not detected in the wide-angle visual field, the control part 200 may control the camera part 100 to be moved in a direction that the person deviates and thus may search again for the person.

The output part 300 may output an image indicating a process in which the gaze of the person is tracked according to a control of the control part 200. The image indicating the process in which the gaze of the person is tracked may include an image which is photographed in the wide-angle visual field, an image in which the face area of the person is enlarged, an image in which the person deviates from a range of the narrow-angle visual field, an image in which the pupils of the eyes of the person are detected and so on. Also, various types of displaying means such as a liquid crystal display (LCD), an organic light-emitting display panel (OLED), an electrophoretic display panel (EDD) and a touch screen may be used as the output part 300.

The memory part 400 may perform a function which stores information for detecting the face area and the eye area when the face area and the eye area are detected by the control part 200.

The memory part 400 may store an image of the face area and an image of an area which is not the face area when the face area is detected and may also store features of the face area which can distinguish between a portion which is not the face area and a portion which is the face area. Also, the memory part 400 may update and store an image with respect to the detected face area whenever the face area is detected.

Also, the memory part 400 may store an image of the eye area and an image of an area which is not the eye area when the eye area is detected from the detected face area and may also store features of the eye area which can distinguish between a portion which is not the eye area and a portion which is the face area. Also, the memory part 400 may update and store an image with respect to the detected eye area whenever the eye area is detected.

Figure 2:
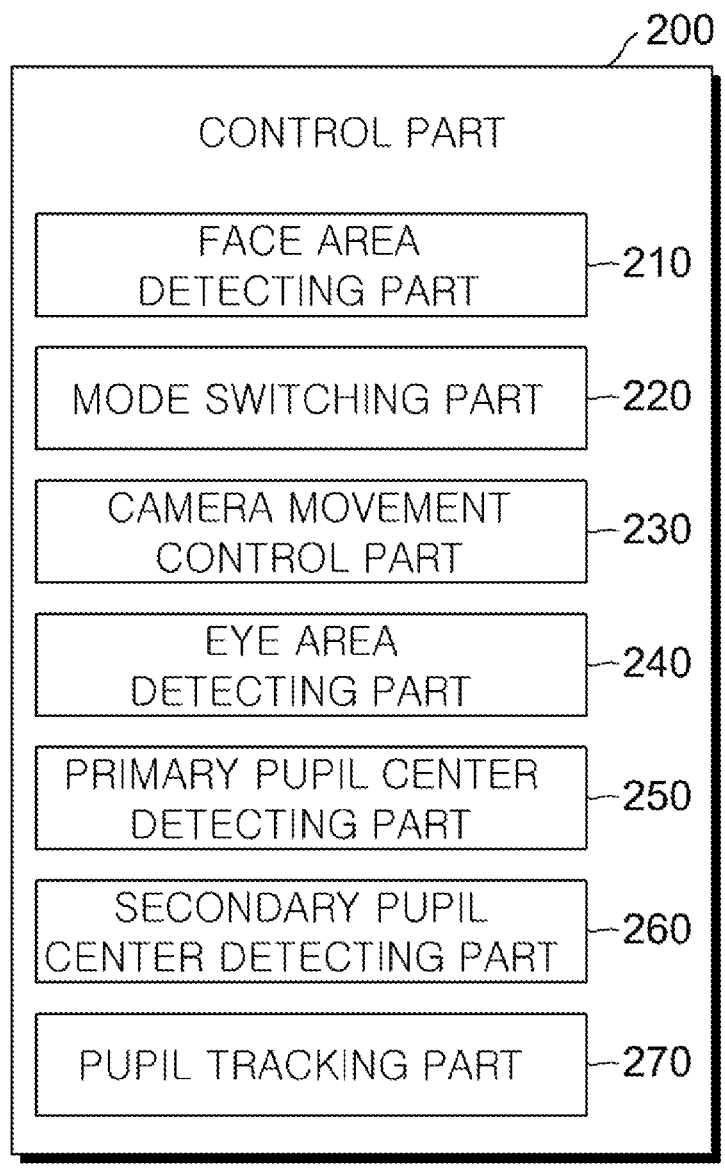
FIG. 2 is a detailed block diagram of a control part illustrated in FIG. 1.
Figure 3A:
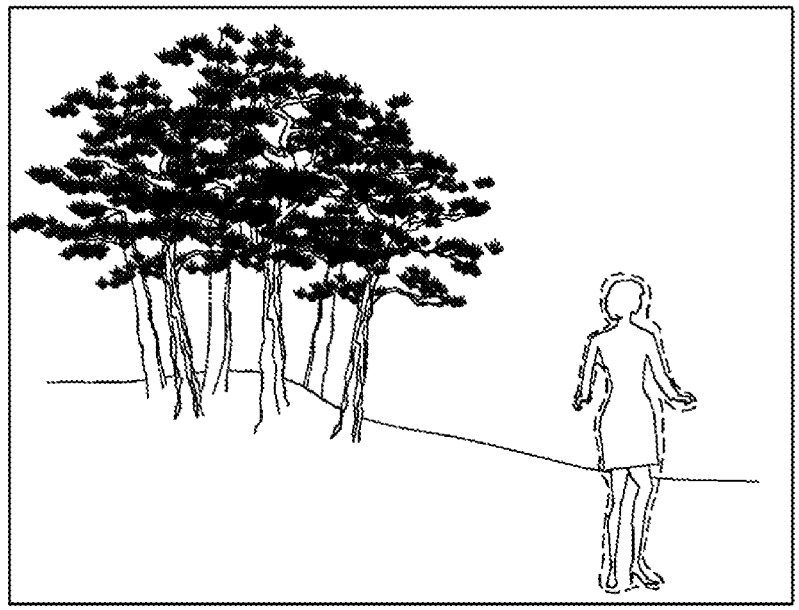
FIGS. 3a and 3b are views illustrating an example of a face area detecting part illustrated in FIG. 2.
Figure 3B:
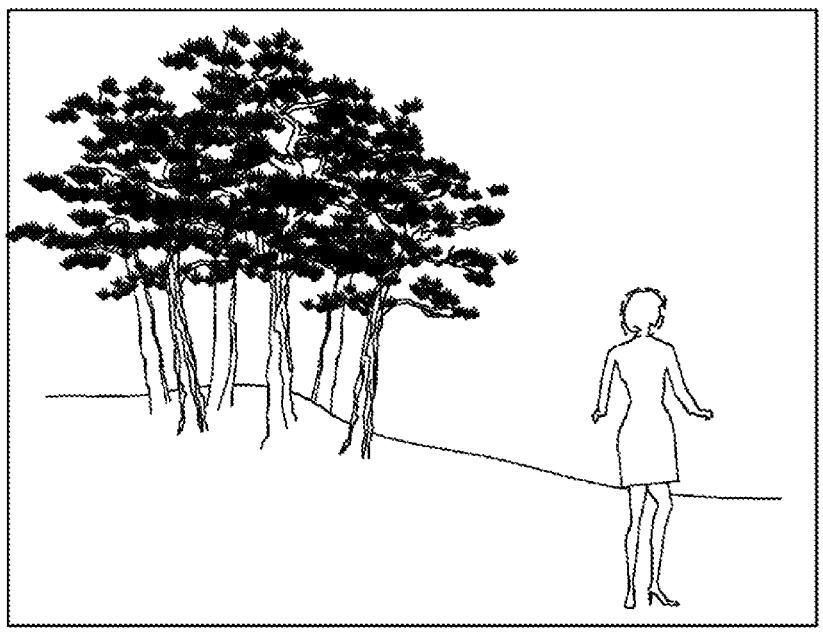
Figure 4:
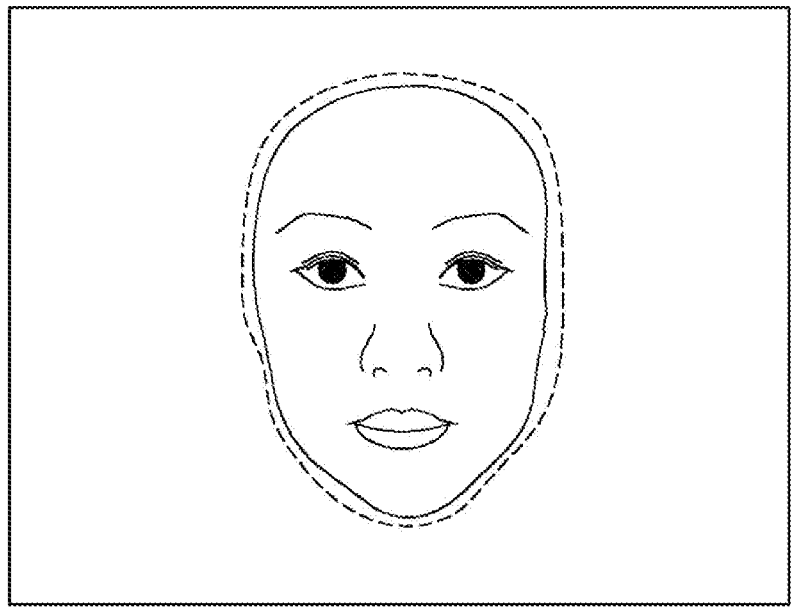
FIG. 4 is a view illustrating an example of a mode switching part illustrated in FIG. 2.
Figure 5:
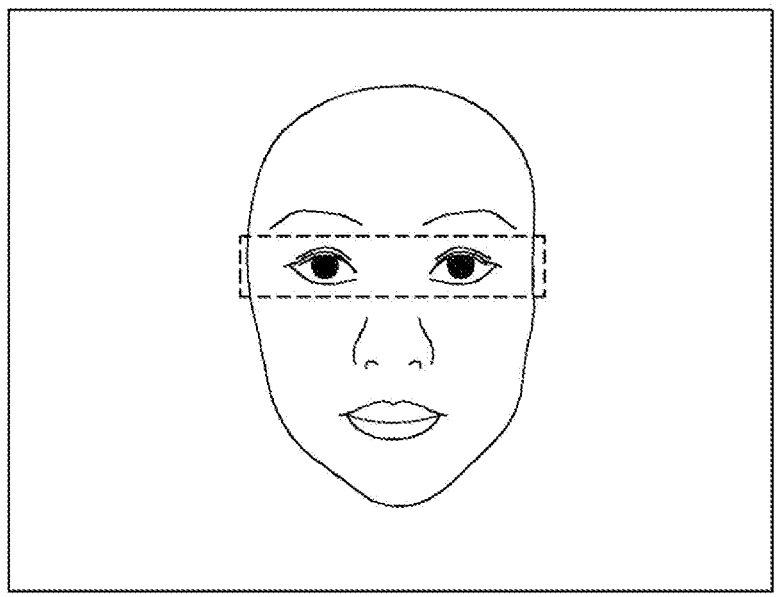
FIG. 5 is a view illustrating an example of an eye area detection part illustrated in FIG. 2.

FIG. 2 is a detailed block diagram of the control part illustrated in FIG. 1, FIGS. 3a and 3b are views illustrating an example of a face area detecting part illustrated in FIG. 2, FIG. 4 is a view illustrating an example of a mode switching part illustrated in FIG. 2, FIG. 5 is a view illustrating an example of an eye area detection part illustrated in FIG. 2, FIGS. 6a, 6b and 6c are views illustrating an example of a primary pupil center detection part illustrated in FIG. 2, and FIGS. 7a, 7b, 7c, 7d, 7e, 7f, 7g and 7h are views illustrating an example of a secondary pupil center detection part illustrated in FIG. 2.

Referring to FIG. 2, the control part 200 according to one embodiment includes a face area detecting part 210, a mode switching part 220, a camera movement control part 230, an eye area detection part 240, a primary pupil center detection part 250, a secondary pupil center detection part 260, and a pupil tracking part 270.

FIG. 2 illustrates the control part 200 having various elements. However, the control part 200 may be realized by more elements than the illustrated elements or may be realized by fewer elements than the illustrated elements. Hereinafter, the above-described elements will be described in detail.

Referring to FIGS. 3a and 3b, the face area detecting part 210 may detect the person from an image around the camera part 100 in the wide-angle visual field and photographed by the camera part 100 set to the wide-angle mode and may detect the face area of the person when the person is detected from the photographed image.

At this point, when the person is not detected from the photographed image, the camera part 100 may be controlled to capture an image of a next photographing area set according to a photographing pattern predetermined by the camera movement control part 230.

Also, the face area detecting part 210 may extract a feature which can distinguish between an image which indicates a face and all of other images which do not indicate the face using the images already stored in the memory part 400 and including the image which indicates only the face and all of other images except the face, and may detect the face area from the photographed image using a face sorter which is generated through a machine learning which repeatedly performs the extracting of the feature.

Meanwhile, the face sorter may include an Adaboost learning sorter. The Adaboost learning sorter is a sorter which is a kind of template matching and uses a method which sorts feature values and detects an object. The Adaboost learning sorter may include a learning operation and an execution operation. In the learning operation, feature values may be extracted from an image which includes the face area and an image which does not include the face area, and the sorter may be formed by the extracted feature values and then may be used to detect the face area. At this point, a plurality of sorters formed according to a matching probability of the extracted feature values may be applied to reduce an erroneous detection rate with respect to the face area. In the execution operation, the face area may be detected by applying the sorters formed in the learning operation.

Meanwhile, a high resolution image with respect to the detected face area may be required to more accurately track the gaze of the person from the detected face area.

Accordingly, the mode switching part 220 may control the photographing mode of the camera part 100 to be switched from the wide-angle mode to the narrow-angle mode and thus may obtain an enlarged image with respect to the face area, as illustrated in FIG. 4.

The narrow-angle mode may enlarge and photograph the face area by adjusting the focal distance of the lens of the camera part 100 into a predetermined reference value or more.

At this point, the focal distance in the narrow-angle mode may be varied within a predetermined range and may be determined according to the size ratio of the face area with respect to the entire image before the expansion. Also, in the enlargement of the face area, the face area may be enlarged by a size of the entire image before the expansion.

Specifically, the size ratio of the face area with respect to the entire image before the expansion may be calculated, and an enlargement magnification of the face area may be calculated according to the calculated size ratio, and the focal distance in the narrow-angle mode may be adjusted according to the calculated enlargement magnification so that the face area may be enlarged and photographed. For example, when the size ratio of the face area with respect to the entire image before the expansion is calculated to 20%, the enlargement magnification for enlarging a size of the face area by the size of the entire image before the expansion is calculated to 5 magnifications, and the narrow-angle mode may calculate and adjust the focal distance corresponding to the 5 magnifications and thus may enlarge the face area by the size of the entire image before the expansion. Meanwhile, the case in which the face area is enlarged by the size of the entire image before the expansion while it is switched into the narrow-angle mode is just an example, and the face area may be enlarged to various sizes, for example, may be enlarged by 50% of the entire image. That is, the size ratio of the face area may be adjusted to a specification which may autonomously track the pupils of the eyes.

As illustrated in FIG. 5, the eye area detection part 240 may detect the eye area from an enlarged face area image.

Specifically, the eye area detection part 240 may detect the eye area using an eye sorter. The eye sorter may extract and store a feature which can distinguish between an image which indicates the eyes and all of other images which do not indicate the eyes using an image which indicate only the eyes and all of other images except the eyes, and may be generated through a machine learning which repeatedly performs the extracting of the feature.

Meanwhile, the eye sorter may include an Adaboost learning sorter.

At this time, the Adaboost learning sorter is a sorter which is a kind of template matching and uses a method which sorts feature values and detects an object. The Adaboost learning sorter may include a learning operation and an execution operation. In the learning operation, feature values may be extracted from an image which includes the eye area and an image which does not include the eye area, and the sorter may be formed by the extracted feature values and then may be used to detect the face area. At this point, a plurality of sorters formed according to a matching probability of the extracted feature values may be applied to reduce an erroneous detection rate with respect to the face area. In the execution operation, the eye area may be detected by applying a weak sorter formed in the learning operation to an input image and then gradationally applying a stronger sorter thereto.

The primary pupil center detection part 250 detects t primary pupil center from the eye area.

Meanwhile, various well-known methods may be used to detect the primary pupil center from the eye area. Hereinafter, a method of detecting the primary pupil center from the eye area by applying a variance projection function (VPF) will be described as an example.

At this point, the VPF is a function of measuring a change in light and shade. When the VOF is applied to an input image, a light and shade value is measured every pixel of the input image, and a difference between an average light and shade value of all of the pixels and the light and shade value of a corresponding pixel may be measured by comparing the average light and shade value of all of the pixels with the light and shade value of the corresponding pixel. Also, when the VPF is applied to the input image and a great difference arises between the average light and shade value of all of the pixels and the light and shade value of the corresponding pixel, a great VPF value may be generated, and when the light and shade value of the corresponding pixel is similar to the average light and shade value, a small VPF value may be generated.

Specifically, the primary pupil center detection part 250 may apply horizontally and vertically the VPF to the eye area may detect the VPF values with respect to horizontal and vertical directions of the eye area and may detect a primary pupil center according to the VPF values with respect to the detected horizontal and vertical directions.

At this point, since an area of the eye area at which the pupil is located is relatively darker than other areas thereof, a relatively great VPF value may be generated. Thus, when the VPF is applied to the eye area in the vertical and horizontal directions, an area at which great VPF values are generated in the vertical and horizontal directions may indicate an area at which the pupil is located. Also, an area crossing the area at which the great VPF values are generated in the vertical and horizontal directions may indicate the area at which the pupil is located.

Figure 6A:
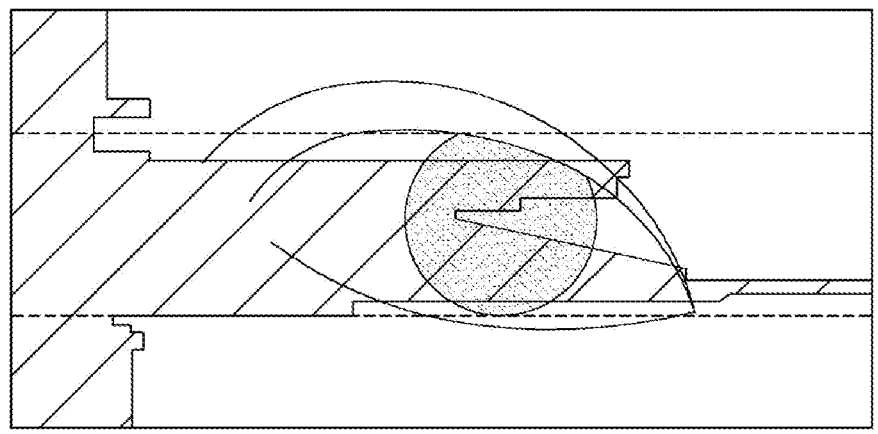
FIGS. 6a, 6b and 6c are views illustrating an example of a primary pupil center detection part illustrated in FIG. 2.
Figure 6B:
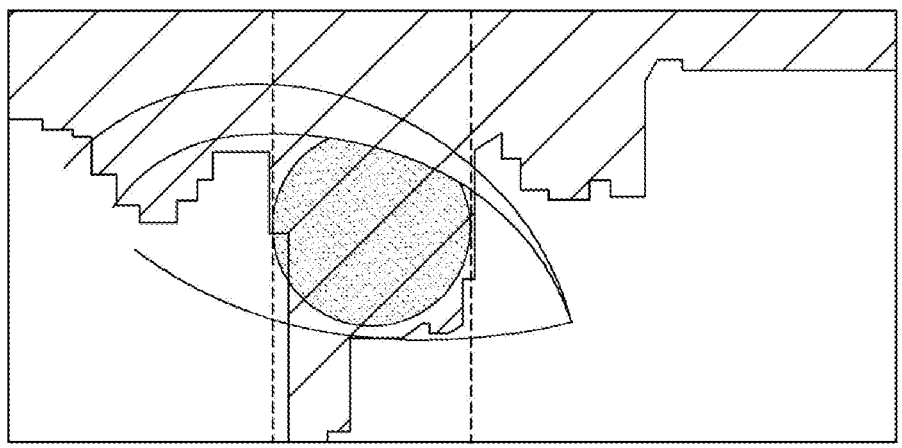
Figure 6C:
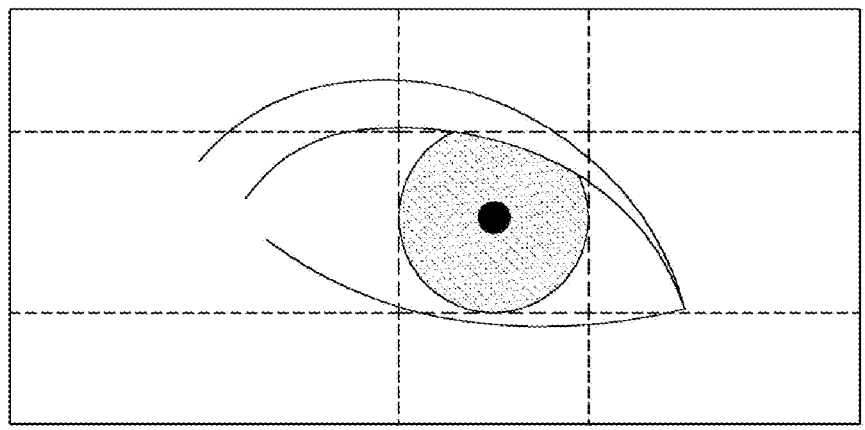

Referring to FIG. 6*a*, when the VPF is horizontally applied to the eye area, the great VPF value is generated at an area located between dotted lines, and the area may indicate the area at which the pupil is located. Referring to FIG. 6*b*, when the VPF is vertically applied to the eye area, the great VPF value is generated at an area located between dotted lines, and the area may indicate the area at which the pupil is located. Referring to FIG. 6*c*, since the area crossing the area at which the great VPF values are generated in the vertical and horizontal directions may indicate the area at which the pupil is located, a center point of the crossing area may be detected as the primary pupil center.

Meanwhile, the center point of the crossing area may be a center of coordinates with respect to the crossing area and may be a center of gravity of the crossing area.

At this point, the VPF values in the vertical and horizontal directions are calculated through Equations (1) and (2).

$$\delta_v^2 = \frac{1}{y_2 - y_1} \sum_{y_i=y_1}^{y_2} [I(x, y_i) - V_m(x)]^2 \quad (1)$$

$$\delta_h^2 = \frac{1}{x_2 - x_1} \sum_{x_i=x_1}^{x_2} [I(x_i, y) - H_m(y)]^2 \quad (2)$$

$$V_m(x) = \frac{1}{y_2 - y_1} \sum_{y_i=y_1}^{y_2} I(x, y_i) \quad (3)$$

$$H_m(y) = \frac{1}{x_2 - x_1} \sum_{x_i=x_1}^{x_2} I(x_i, y) \quad (4)$$

wherein $\delta_v^2$ and $\delta_h^2$ are the VPF values in the vertical and horizontal directions, respectively, and I is a gray scale image, and each of V(x)H(x) is a sum of the light and shade values in x and y directions. Center coordinates of the primary pupil center $initPC_{x,y}$ are calculated by finding the smallest valley from the vertical and horizontal VPF.

$$initPC_x = (V_{x2} - V_{x1})/2 + V_{x1} \quad (5)$$

$$initPC_y = (V_{y2} - V_{y1})/2 + V_{y1} \quad (6)$$

wherein $V_{x1}$ and $V_{x2}$ are valleys of the vertical VPF, and $V_{y1}$ and $V_{y2}$ are valleys of the horizontal VPF.

Figure 7A:
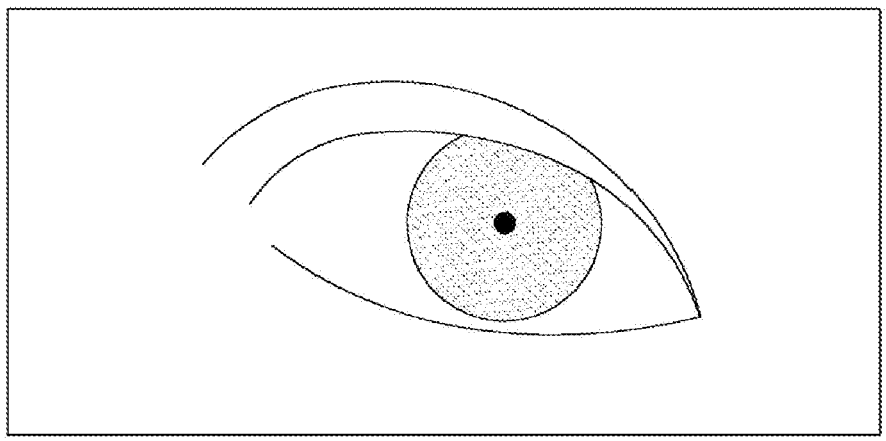
FIGS. 7a, 7b, 7c, 7d, 7e, 7f, 7g and 7h are views illustrating an example of a secondary pupil center detection part illustrated in FIG. 2.
Figure 7B:
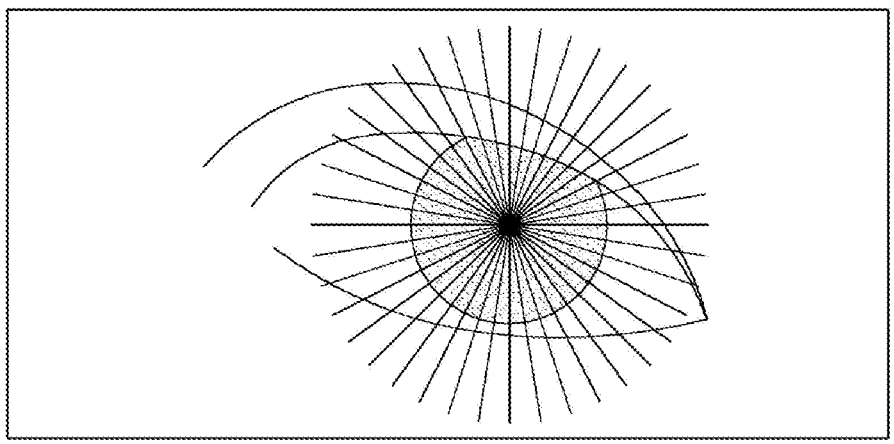

As illustrated in FIGS. 7a and 7b, the secondary pupil center detection part 260 may straightly search for an edge point $pEdge_i(x,y)$ while rotating at every angle of $\alpha°$ based on the primary pupil center $initPC_{x,y}$ (i=1 . . . N, N: the number of found edge points).

$$pEdge_i(x, y) = \begin{cases} true & if\ I(L_{lx}, L_{ly}) > th \\ false & otherwise \end{cases} \quad (7)$$

wherein $L_l$ is coordinates of l-th straight line which is searched based on $initPC_{x,y}$, and th is a threshold value. When the light and shade value at a corresponding position is greater than the threshold value, the corresponding position is the edge point. The threshold valve is decided as an average light and shade value which is searched from $initPC_{x,y}$ to $L_l-1$.

Figure 7C:
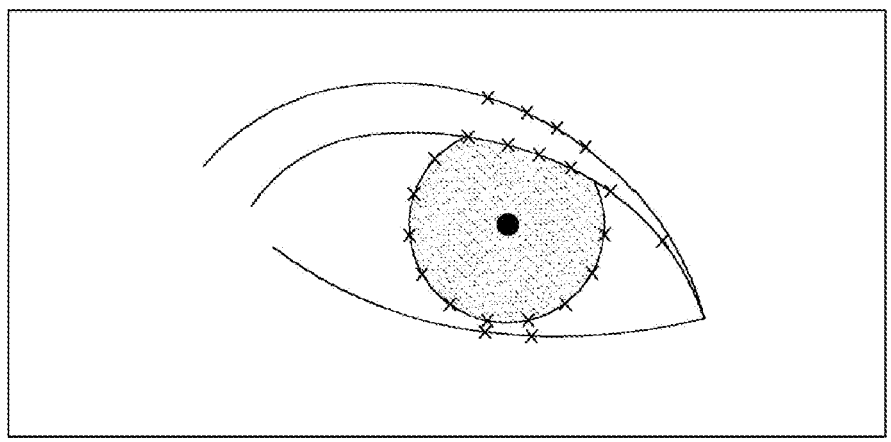
Figure 7D:
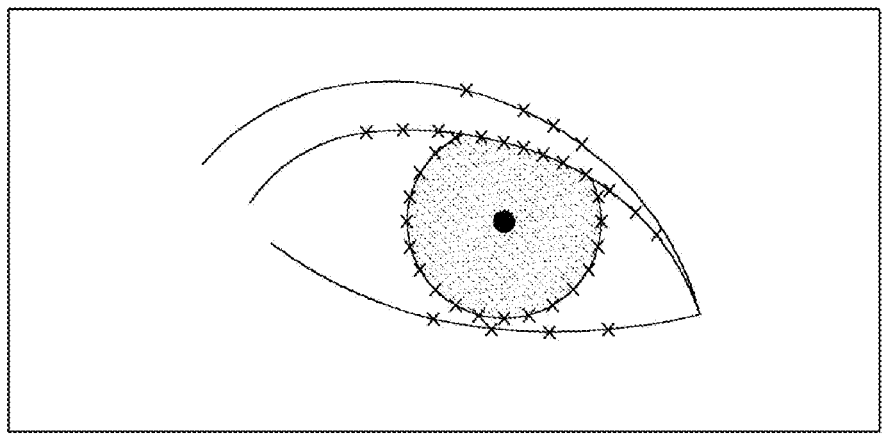
Figure 7E:
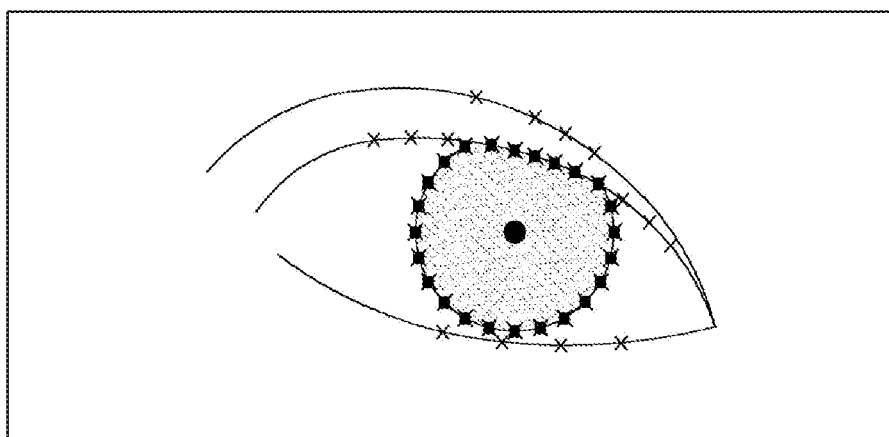

As illustrated in FIGS. 7c and 7d, the edge point is searched again from the searched edge point using Equation (7). The primary pupil center $initPC_{x,y}$ is calculated again using an average position of the re-searched edge point $pEdge_i(x,y)$.

$$initPC' = AVERAGE(pEdge) \quad (8)$$

wherein AVERAGE is a function for calculating the average position of the edge points. As illustrated in FIG. 7e, a distance between the edge points is calculated based on initPC', and then a point which satisfies the following condition is filtered out as an effective point $pEdge'_i$.

$$\|initPC' - pEdge_i\| \leq dis_1\ AND\ \|initPC' - pEdge_i\| \leq dis_2 \quad (9)$$

wherein $dis_1$, $dis_2$ are the threshold values which are obtained by an average distance between and initPC' and $pEdge_i(x,y)$.

Figure 7F:
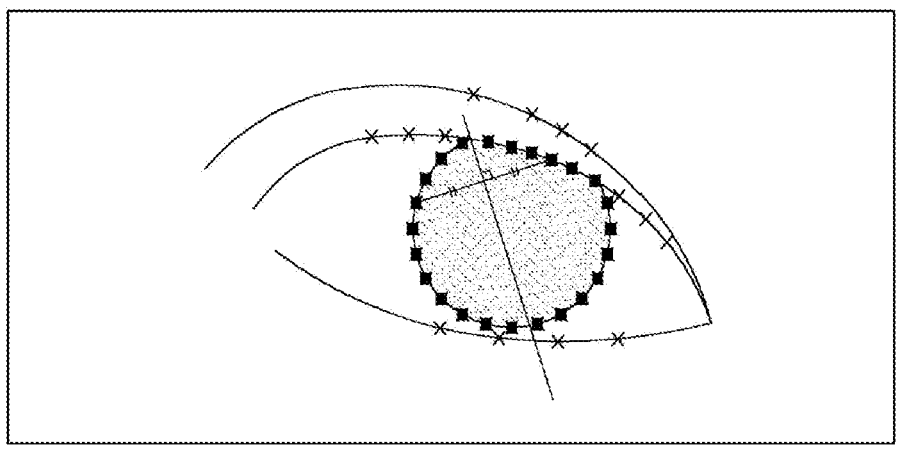
Figure 7G:
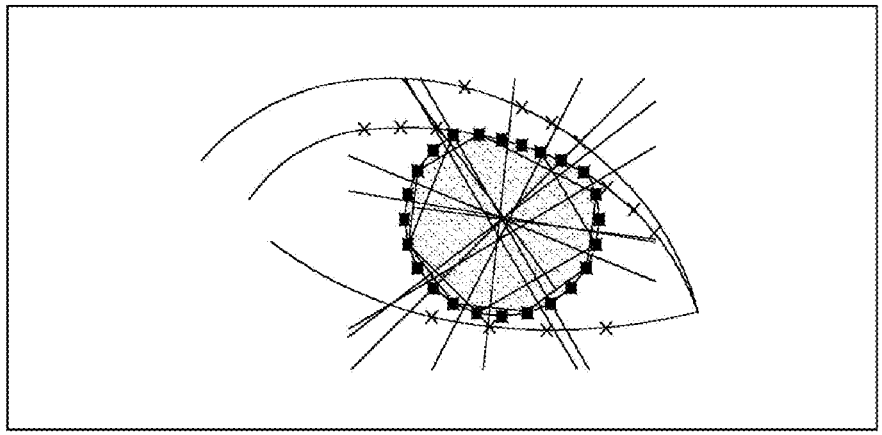

As illustrated in FIG. 7f, a perpendicular bisector between the filtered effective points may be calculated using a principle in which the perpendicular bisector of a chord of a circle always passes through a center of the circle and then may be accumulated on a two (2) dimensional arrangement as illustrated in FIG. 7g.

Figure 7H:
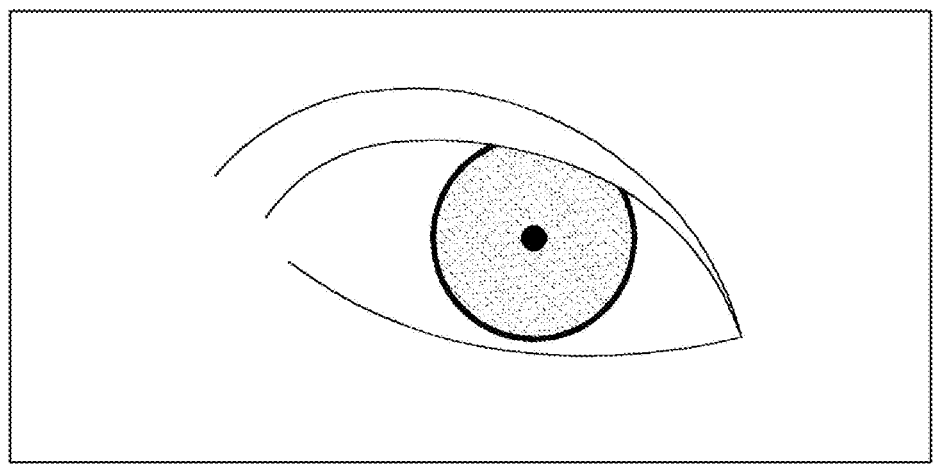

Lastly, as illustrated in FIG. 7h, centers of the positions corresponding to top 5% of the accumulated arrangement may be detected as the pupil centers.

Figure 8A:
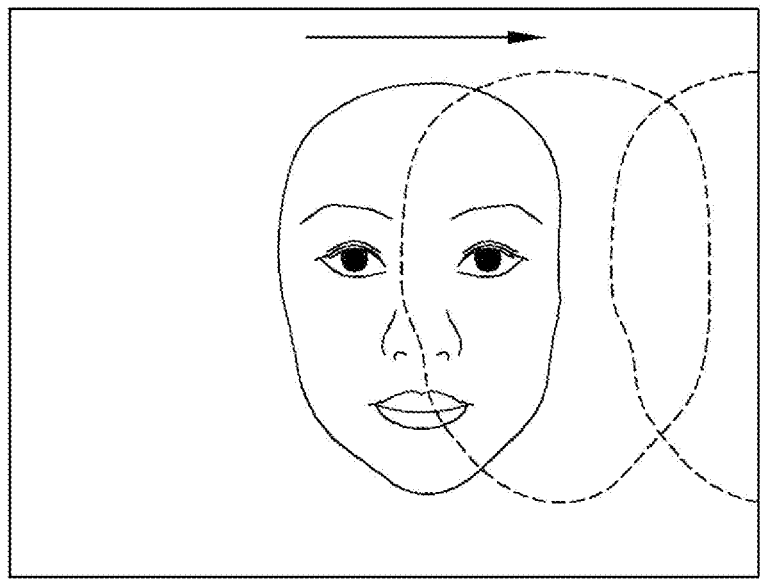
FIGS. 8a and 8b are views illustrating an example of the mode switching part and a camera movement control part illustrated in FIG. 2.
Figure 8B:
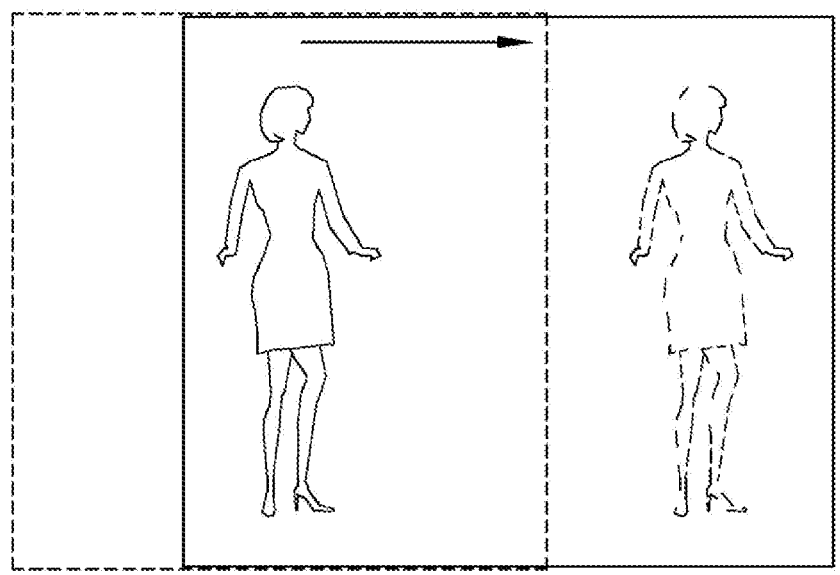

FIGS. 8a and 8b are views illustrating an example of the mode switching part and the camera movement control part illustrated in FIG. 2.

As illustrated in FIG. 8a, when the person deviates outside the photographing range from an image of the face area enlarged and photographed by the camera part which is switched into the narrow-angle mode, the mode switching part 220 switches the camera part 100 from the narrow-angle mode to the wide-angle mode, and as illustrated in FIG. 8b, the camera movement control part 230 may search again for the person by moving a photographing direction of the camera part 100.

The pupil tracking part 270 may track the gaze of the person by tracking the detected secondary pupil center.

Figure 9:
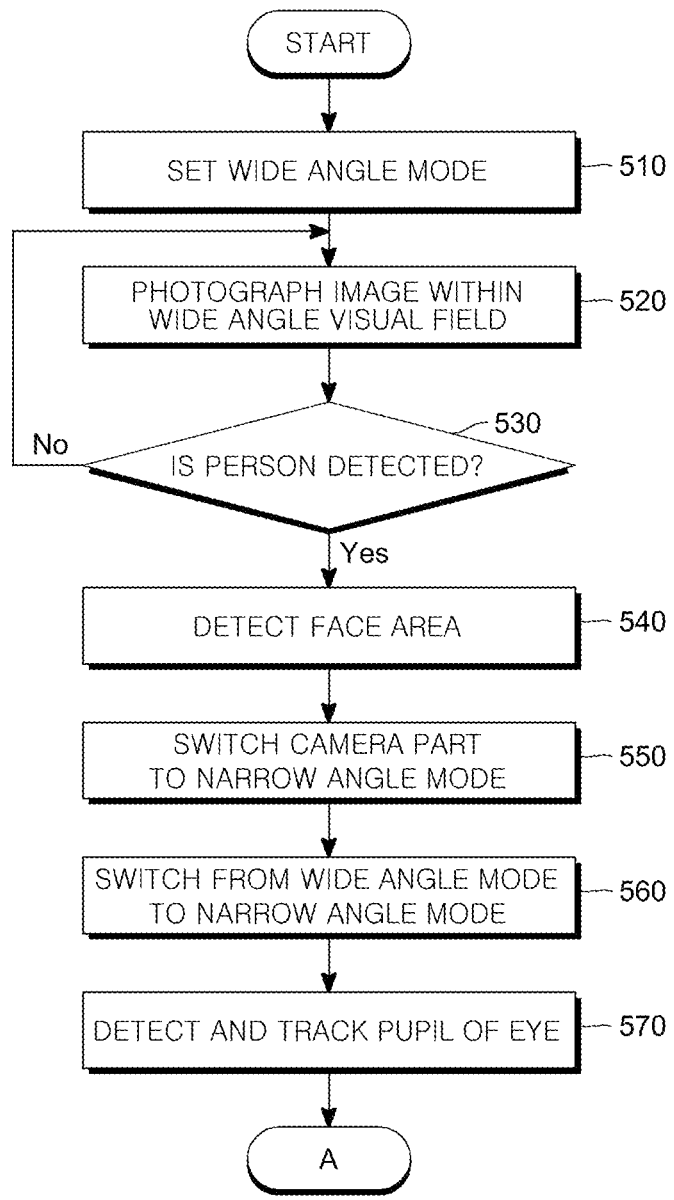
FIG. 9 is a flowchart illustrating a gaze tracking method according to one embodiment of the present invention.

FIG. 9 is a flowchart illustrating a gaze tracking method according to one embodiment of the present invention.

When the gaze tracking process starts, the gaze tracking device 1 sets the camera part 100 into the wide-angle mode (510).

The camera part 100 set into the wide-angle mode photographs the image around the camera part 100 in the wide-angle visual field (520). It is confirmed whether the person exists in the photographed image (530).

Also, when the person is detected from the photographed image, the gaze tracking device 1 detects the face area of the person (540). When the face area of the person is detected, the photographing mode of the camera part 100 is switched from the wide-angle mode into the narrow-angle mode (550), Meanwhile, when the person is not detected from the photographed image, the camera part 100 moves according to the predetermined photographing pattern, photographs the image around the camera part 100 in the wide-angle visual field and thus detects the person.

The camera part 100 switched into the narrow-angle mode enlarges and photographs the detected face area by controlling a photographing magnification and then detects and tracks the pupils of the eyes of the person from the enlarged and photographed image of the face area (560 to 570).

Meanwhile, the gaze tracking device 1 may detect the face area from the photographed image by matching a face area feature for detecting the face area with the photographed image and detecting the face area.

Meanwhile, in the switching of the photographing mode of the camera part 100 from the wide-angle mode into the narrow-angle mode, the high resolution image with respect to the face area may be required to more accurately track the gaze of the person from the face area. Accordingly, the photographing mode of the camera part 100 may be switched from the wide-angle mode into the narrow-angle mode, and the focal distance of the lens in the camera part 100 may be adjusted equal to or greater than the predetermined reference value. The focal distance of the lens in the camera part 100 may be adjusted so that the face area is enlarged by a size of the photographed image around the camera part 100.

Figure 10:
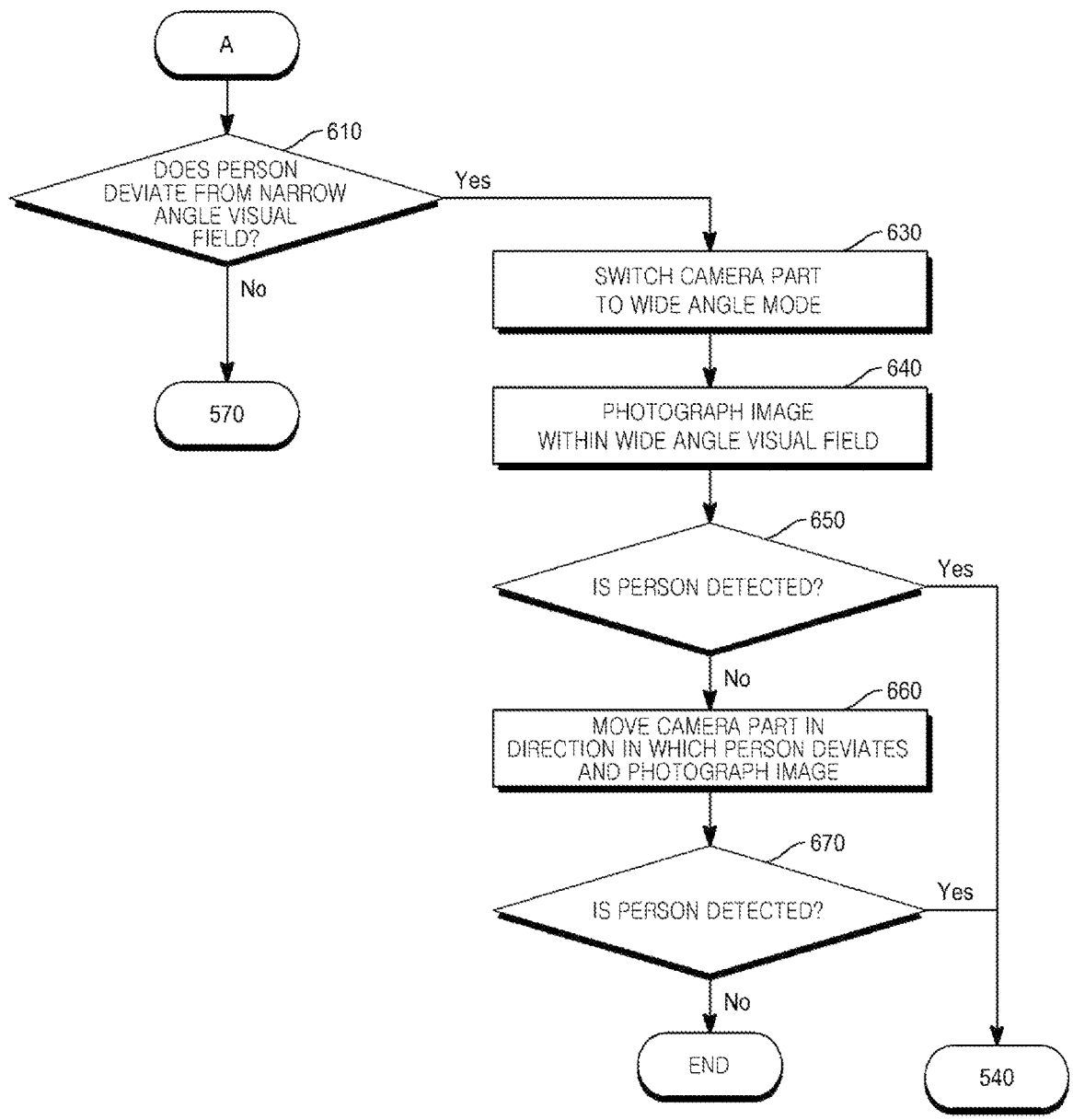
FIG. 10 is a flowchart illustrating the gaze tracking method according to one embodiment of the present invention.

FIG. 10 is a flowchart illustrating the gaze tracking method according to one embodiment of the present invention.

When the person deviates from the narrow-angle visual field of the narrow-angle mode while the gaze of the person is tracked within the narrow-angle visual field of the narrow-angle mode, the gaze tracking device 1 may search again for the person through controlling of the camera part 100 and thus may track the gaze of the person.

It is confirmed whether the person deviates from the narrow-angle visual field of the narrow-angle mode (610). When the person does not deviate from the narrow-angle visual field of the narrow-angle mode, the pupils of the person are detected and tracked from the enlarged and photographed image of the face area (570).

Also, when the person deviates from the narrow-angle visual field of the narrow-angle mode, the photographing mode of the camera part 100 is switched from the narrow-angle mode into the wide-angle mode (630) and then the image around the camera part 100 in the wide-angle visual field is photographed while being switched into the wide-angle mode (640).

Also, when the person is detected from the image around the camera part 100 in the wide-angle visual field (650), the face area of the person is detected, and the photographing mode of the camera part 100 is switched into the narrow-angle mode to enlarge and photograph the face area, and the pupils of the eyes of the person are detected and tracked from the enlarged and photographed face area (540).

Also, when the person is not detected from the image around the camera part 100 in the wide-angle visual field (650), the camera part 100 is moved in a direction in which the person deviates, and an image is photographed (660). When the person is detected from the image photographed after the camera part 100 is moved (670), the face area of the person is detected, and the camera part 100 is switched into the narrow-angle mode to enlarge and photograph the face area, and thus the gaze of the person may be detected and tracked (540).

Also, when the person is not detected from the image photographed after the camera part 100 is moved (650), the gaze tracking process is terminated.

Figure 11:
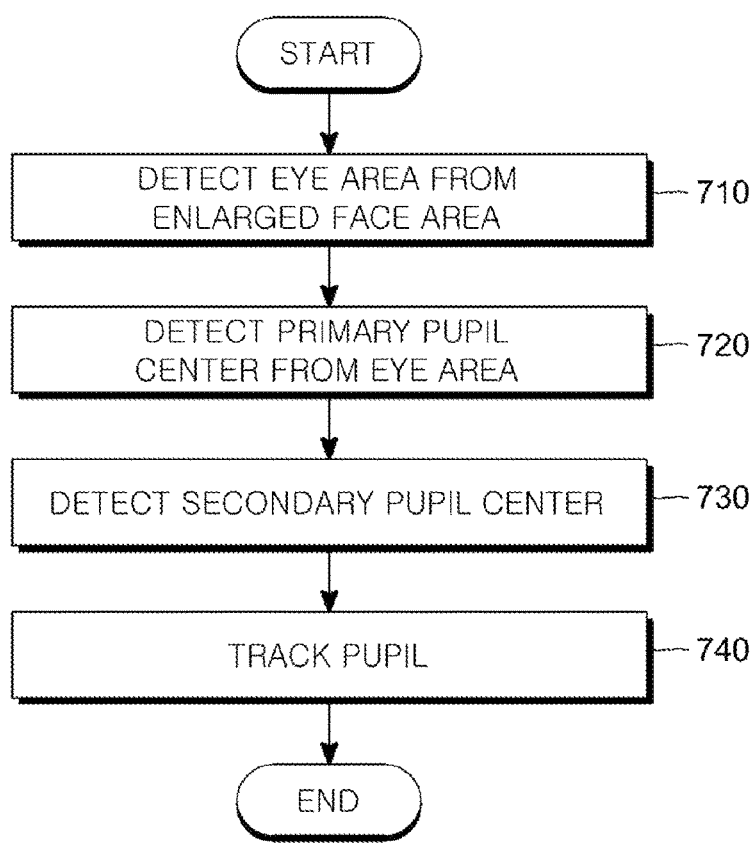
FIG. 11 is a flowchart illustrating a method of detecting pupils of eyes of a person at a face area according to one embodiment of the present invention.

FIG. 11 is a flowchart illustrating a method of detecting the pupils of the eyes of the person at the face area according to one embodiment of the present invention.

The eye area is detected from the enlarged and photographed face area (710).

Meanwhile, in the detecting of the eye area from the enlarged and photographed face area, the eye area may be detected by matching an eye area feature for detecting the eye area with the face area image.

Also, in general, when the person fixes his/her eyes on a certain point, eyeballs are adjusted so that the certain point is located at a center of the pupil. Accordingly, the pupil center is detected from the detected eye area to track the gaze of the person.

Meanwhile, in the detecting of the pupil centers from the detected eye area, the pupil center is detected primarily and secondarily. This is to consider a case in which the pupil center is erroneously detected due to noise such as a light which is reflected on glasses or the pupils of the eyes.

The primary pupil center is detected from the detected eye area by applying the VPF (720) and the secondary pupil center is detected based on the detected primary pupil center (730). Then, the gaze of the person is tracked by tracking the detected secondary pupil center (740).

Figure 12:
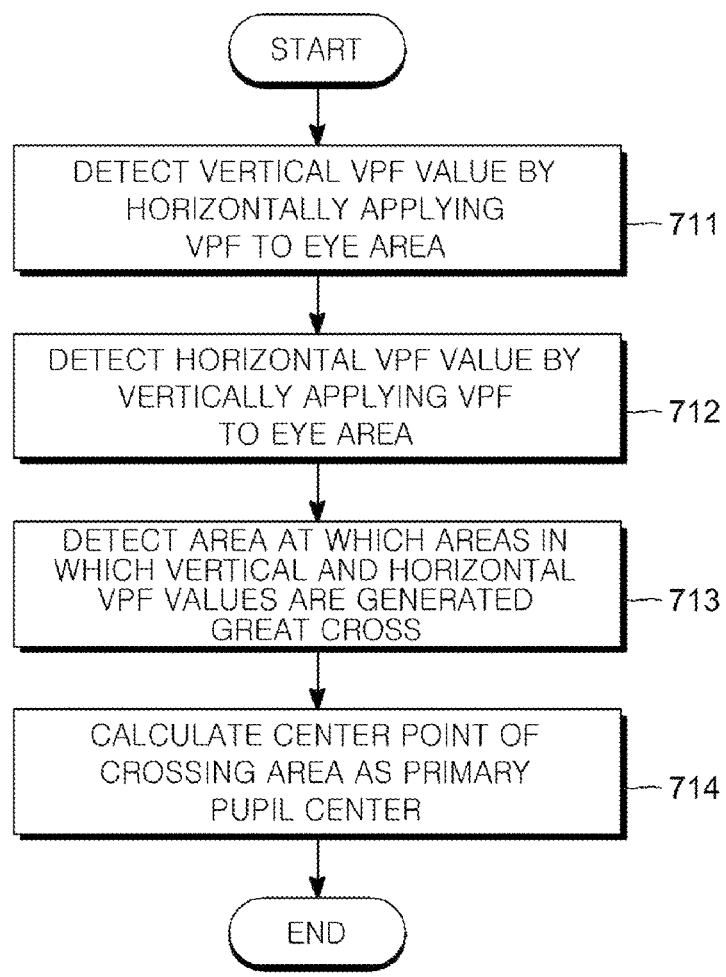
FIG. 12 is a flowchart illustrating a primary pupil center detecting method according to one embodiment of the present invention.

FIG. 12 is a flowchart illustrating a primary pupil center detecting method according to one embodiment of the present invention.

At this point, the primary pupil center may be detected by applying the VPF for measuring a change in the light and shade of a pixel to the eye area. To more accurately detect the primary pupil center, the primary pupil center may be detected by vertically and horizontally applying the VPF to the eye area. Also, the primary pupil center may be detected using a fact that, when a light and shade value of a corresponding pixel of the VPF is much different from an average light and shade value of the entire image, a great VPF value is generated, and when the light and shade value of the corresponding pixel of the VPF is similar to the average light and shade value of the entire image, a small VPF value is generated.

The VPF value in the vertical direction is detected by vertically applying the VPF to the detected eye area (711).

Also, the VPF value in the horizontal direction is detected by horizontally applying the VPF to the detected eye area (712).

At this point, since a pupil area in the eye area is darker than another area, a change in the light and shade may be generated considerably. Accordingly, an area in which the great VPF value of the VPF values in the vertical and horizontal directions is generated may be an area in which the pupil of the eye is located in the vertical and horizontal directions, and an area crossing the area in which the great VPF values are generated in the vertical and horizontal directions may be detected as the eye area.

Also, the area crossing the area in which the great VPF values are generated in the vertical and horizontal directions may be detected (713), and a center of the crossing area is calculated as the primary pupil center (714).

Figure 13:
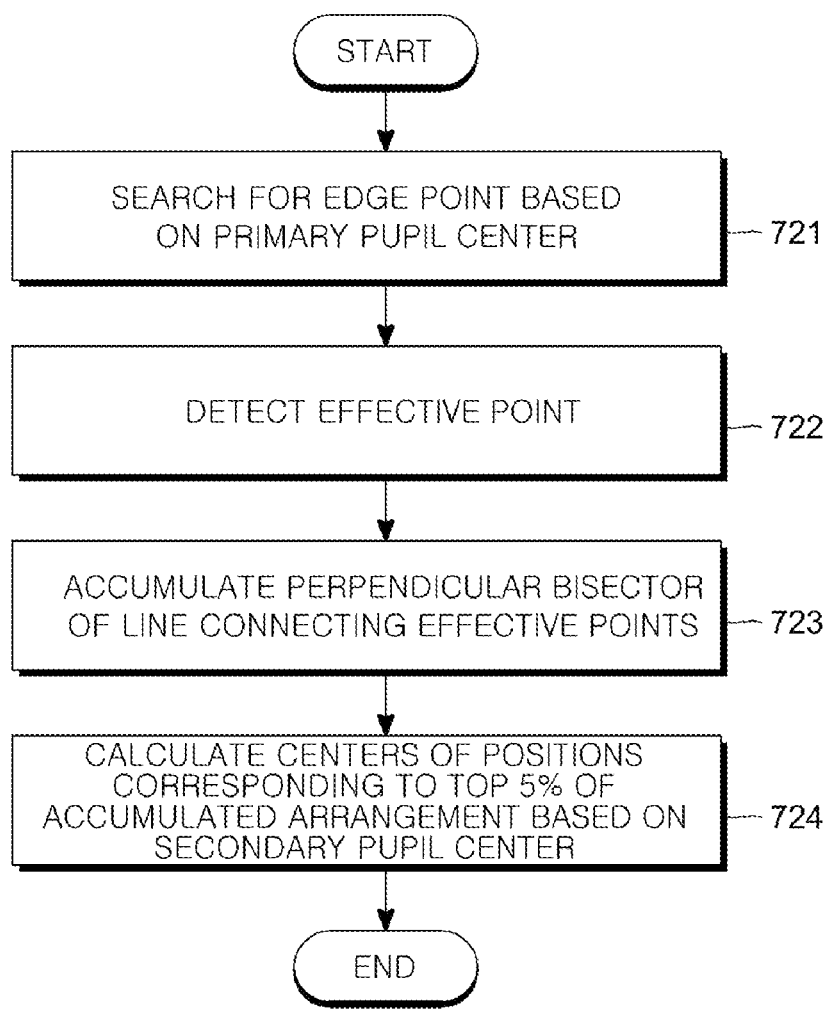
FIG. 13 is a flowchart illustrating a secondary pupil center detecting method according to one embodiment of the present invention.

FIG. 13 is a flowchart illustrating a secondary pupil center detecting method according to one embodiment of the present invention.

The edge point is straightly searched while rotating at every angle of $\alpha°$ based on the primary pupil center (721). The effective point is filtered from the detected edge points through a predetermined method (722).

The perpendicular bisector between the filtered effective points may be calculated using the principle in which the perpendicular bisector of a chord of a circle always passes through a center of the circle and then may be accumulated on a 2 dimensional arrangement (723).

Finally, the positions corresponding to top 5% of the accumulated arrangement is detected, and centers of the positions corresponding to the top 5% of the accumulated arrangement is calculated as the secondary pupil centers (724).

The technique for tracking the gaze of the person as described above may be realized in the form of an application or a program instruction which may be executed through various computer elements and then may be stored in a computer-readable recording medium. The computer-readable medium may include a program command, a data file, and a data structure, individually or as a combination thereof.

The program instruction recorded in the computer-readable recording medium is specially designed and configured for the present disclosure, but may be used after being made known to those skilled in computer software fields.

Examples of the computer-readable recording medium include magnetic media such as hard disks, floppy disks and magnetic tapes, optical recording media such as a Compact Disc Read-Only Memory (CD-ROM) and a Digital Versatile Disc (DVD), magneto-optical media such as floptical disks, and hardware devices such as a Read-Only Memory (ROM), a Random Access Memory (RAM) and a flash memory, which are configured to store and perform program instructions.

Examples of the program instructions include a machine language code generated by a compiler and a high-level language code that a computer may execute by using an interpreter and the like. The hardware devices may be configured to operate as at least one software module to perform the operations of the present disclosure, and vice versa.

Although a few embodiments of the present invention have been shown and described, it would be appreciated by those skilled in the art that changes may be made in these embodiments without departing from the principles and spirit of the invention, the scope of which is defined in the claims and their equivalents.

DETAILED DESCRIPTION OF MAIN ELEMENTS

1: gaze tracking device
100: camera part
200: control part
300: output part
400: memory part

The invention claimed is:

1. A gaze tracking device comprising:
a camera part photographing an image in a wide-angle mode; and
a control part having a memory and a processor,
wherein, if a person is detected from the image in the wide-angle mode, the control part has a configuration detecting a face area of the person, switching a mode of the camera part from the wide-angle mode into a narrow-angle mode, and tracking a gaze of the person,
wherein, if the person is not caught in the image during the tracking of the gaze of the person in the narrow-angle mode, the control part has a configuration switching the mode of the camera part from the narrow-angle mode to the wide-angle mode to search the person, and
if the person is not caught in the image by the switch of the mode of the camera from the narrow-angle mode to the wide-angle mode, the control part controls the camera part to move in a direction that the person deviates from the image,
wherein the control part includes:
a face area detecting part detecting the face area of the person;
a mode switching part switching between the wide-angle mode and the narrow-angle mode of the camera part;
a camera movement control part controlling and moving the camera part;
an eye area detection part detecting an eye area from the face area in the image; and
a pupil detecting part detecting a pupil of an eye from the eye area and controlling the camera part to track the pupil and,
wherein the pupil detecting part calculates a primary pupil center from the eye area, detects a secondary pupil center of the pupil using circle and edge information based on the primary pupil center, and tracks the secondary pupil center.

2. The gaze tracking device of claim 1, wherein the primary pupil center is calculated by applying a variance projection function (VPF) to the eye area, a plurality of edge points of the eye area are detected based on the primary pupil center, an effective point of the plurality of the edge points is calculated, a perpendicular bisector between the effective points is accumulated, a crossing point of the perpendicular bisectors is detected as the secondary pupil center of the pupil and the secondary pupil center is tracked.

3. A gaze tracking method comprising:
photographing an image in a wide-angle mode;
if a person is detected from the image in the wide-angle mode, detecting a face area of the person from the image in the wide-angle mode;
switching a mode of the camera part from the wide-angle mode into a narrow-angle mode;
tracking a gaze of the person;
if the person is not caught in the image during the tracking of the gaze of the person in the narrow-angle mode, switching the mode of the camera part from the narrow-angle mode to the wide-angle mode to search the person;
if the person is not caught in the image by the switch of the mode of the camera from the narrow-angle mode to the wide-angle mode, controlling the camera part to move in a direction that the person deviates from the image;
detecting an eye area from the face area in the image;
detecting a pupil of an eye from the eye area and tracking the pupil; and
calculating a primary pupil center from the eye area, detecting a secondary pupil center of the pupil using circle and edge information based on the primary pupil center, and tracking the secondary pupil center.

4. A non-transitory computer-readable recording medium having stored thereon a computer program, the computer program, when executed, causing a processor to implement a method for tracking gaze, the method comprising the steps of: photographing an image in a wide-angle mode;
if a person is detected from the image in the wide-angle mode, detecting a face area of the person from the image in the wide-angle mode;
switching a mode of the camera part from the wide-angle mode into a narrow-angle mode;
tracking a gaze of the person;
if the person is not caught in the image during the tracking of the gaze of the person in the narrow-angle mode, switching the mode of the camera part from the narrow-angle mode to the wide-angle mode to search the person;
if the person is not caught in the image by the switch of the mode of the camera from the narrow-angle mode to the wide-angle mode, controlling the camera part to move in a direction that the person deviates from the image;
detecting an eye area from the face area in the image;
detecting a pupil of an eye from the eye area and tracking the pupil; and
calculating a primary pupil center from the eye area, detecting a secondary pupil center of the pupil using circle and edge information based on the primary pupil center, and tracking the secondary pupil center.

5. The gaze tracking method of claim 3, wherein the primary pupil center is calculated by applying a variance projection function (VPF) to the eye area, a plurality of edge points of the eye area are detected based on the primary pupil center, an effective point of the plurality of the edge points is calculated, a perpendicular bisector between the effective points is accumulated, a crossing point of the perpendicular bisectors is detected as the secondary pupil center of the pupil and the secondary pupil center is tracked.

6. The non-transitory computer-readable recording medium of claim 4, wherein the primary pupil center is calculated by applying a variance projection function (VPF) to the eye area, a plurality of edge points of the eye area are detected based on the primary pupil center, an effective point of the plurality of the edge points is calculated, a perpendicular bisector between the effective points is accumulated, a crossing point of the perpendicular bisectors is detected as the secondary pupil center of the pupil and the secondary pupil center is tracked.

7. The gaze tracking method of claim 3, wherein the step of the detecting the face area of the person from the image in the wide-angle mode further comprises:
    if a person is not detected from the image in the wide-angle mode, controlling the camera part in a predetermined photographing pattern and tracks the person.

8. The gaze tracking method of claim 3, wherein the step of the switching a mode of the camera part from the wide-angle mode into a narrow-angle mode further comprises:
    enlarging and photographing the face area by switching from the wide-angle mode, in which a focal distance of a lens of the camera part is less than or equal to a predetermined reference value, to the narrow-angle mode, in which the focal distance of the lens of the camera part is greater than or equal to the predetermined reference value.

9. The gaze tracking method of claim 8, wherein the step of the enlarging and the photographing the face area adjusts the focal distance of the lens of the camera part in the narrow-angle mode to enlarge and photograph the face area by a size of the image in the wide-angle mode.

10. The non-transitory computer-readable recording medium of claim 4, wherein the step of the detecting the face area of the person from the image in the wide-angle mode further comprises:
    if a person is not detected from the image in the wide-angle mode, controlling the camera part in a predetermined photographing pattern and tracks the person.

11. The non-transitory computer-readable recording medium of claim 4, wherein the step of the switching a mode of the camera part from the wide-angle mode into a narrow-angle mode further comprises:
    enlarging and photographing the face area by switching from the wide-angle mode, in which a focal distance of a lens of the camera part is less than or equal to a predetermined reference value, to the narrow-angle mode, in which the focal distance of the lens of the camera part is greater than or equal to the predetermined reference value.

12. The non-transitory computer-readable recording medium of claim 11, wherein the step of the enlarging and the photographing the face area adjusts the focal distance of the lens of the camera part in the narrow-angle mode to enlarge and photograph the face area by a size of the image in the wide-angle mode.

* * * * *